Figure 4:
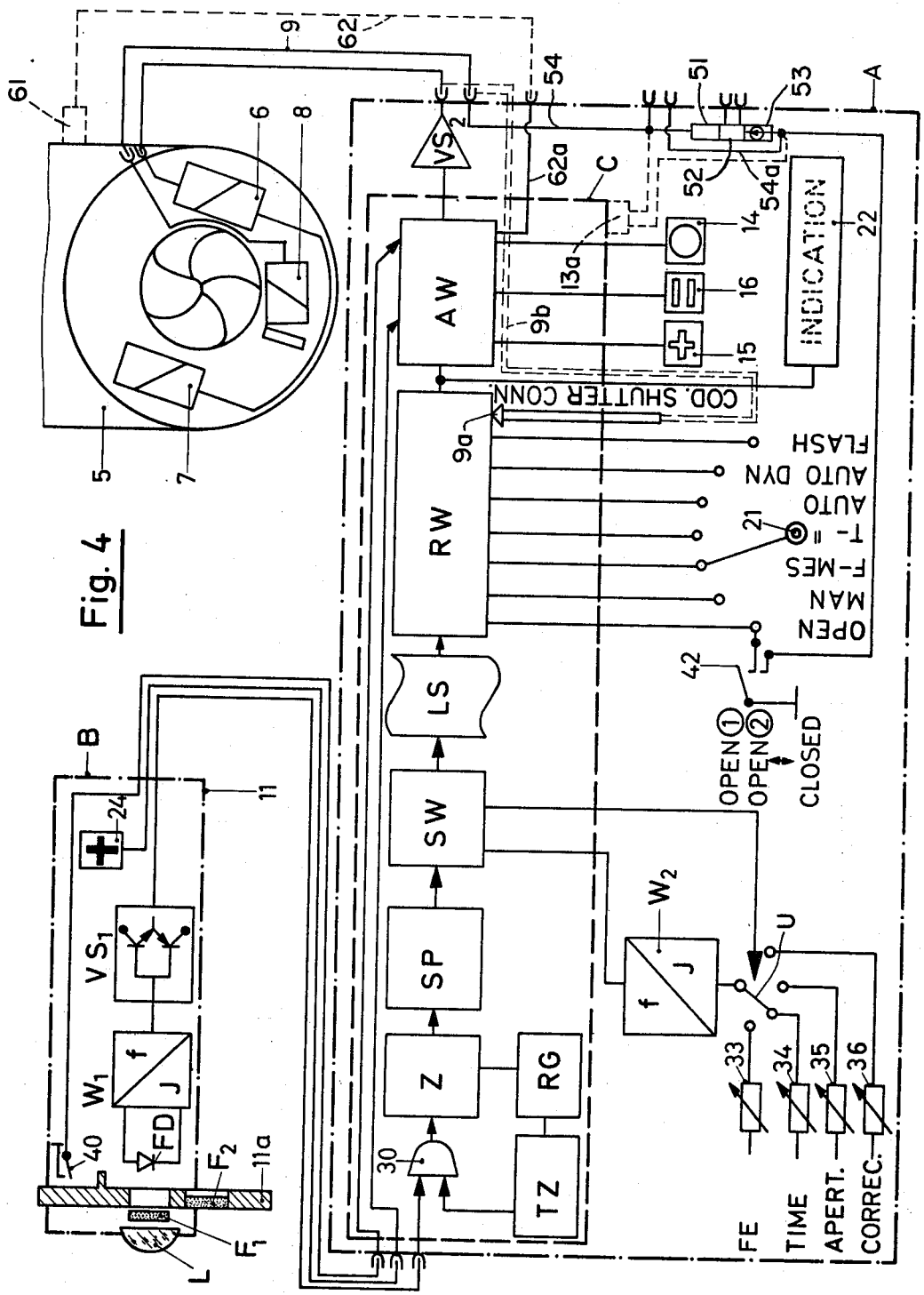

United States Patent [19]

Rentschler et al.

[11] 4,277,155
[45] Jul. 7, 1981

[54] CONTROL DEVICE FOR PHOTOGRAPHIC CAMERAS

[75] Inventors: Waldemar Rentschler; Franz Starp; Winfried Espig, all of Wildbad, Fed. Rep. of Germany

[73] Assignee: Prontor-Werk Alfred Gauthier GmbH, Fed. Rep. of Germany

[21] Appl. No.: 73,756

[22] Filed: Sep. 10, 1979

[30] Foreign Application Priority Data

Sep. 15, 1978 [DE] Fed. Rep. of Germany ....... 2840185

[51] Int. Cl.$^3$ .................... G03B 7/097; G03B 15/03
[52] U.S. Cl. .................... 354/23 D; 354/38; 354/59; 354/32; 354/60 A; 354/60 E
[58] Field of Search .............. 354/23 R, 22, 38, 50, 354/51, 60 R, 75, 76, 81, 288, 293, 295, 266, 269, 258, 23 D, 139, 149, 60 L, 60 A, 60 E, 32, 42, 48, 59

[56] References Cited

U.S. PATENT DOCUMENTS

| | | |
|---|---|---|
| 3,460,451 | 8/1969 | Starp et al. .................... 354/51 |
| 3,518,927 | 7/1970 | Mehlitz et al. ................ 354/60 R X |
| 3,526,180 | 9/1970 | Fahlenberg et al. ................ 354/269 |
| 3,533,347 | 10/1970 | Auguste et al. ................ 354/38 X |

*Primary Examiner*—L. T. Hix
*Assistant Examiner*—William B. Perkey
*Attorney, Agent, or Firm*—Arthur A. March

[57] ABSTRACT

A control device independent of and designed for use with professional cameras for operating an electromagnetically drivable shutter or magnetic shutter and for determining and setting exposure values, wherein the device includes a power source and means for determining and setting exposure values, both of which are exchangeably or detachably connectable operatively via the control device to the magnetic shutter and to a light measuring or metering probe, the means for determining and setting the exposure values being adjustable to operate in a plurality of selective functional modes.

31 Claims, 4 Drawing Figures

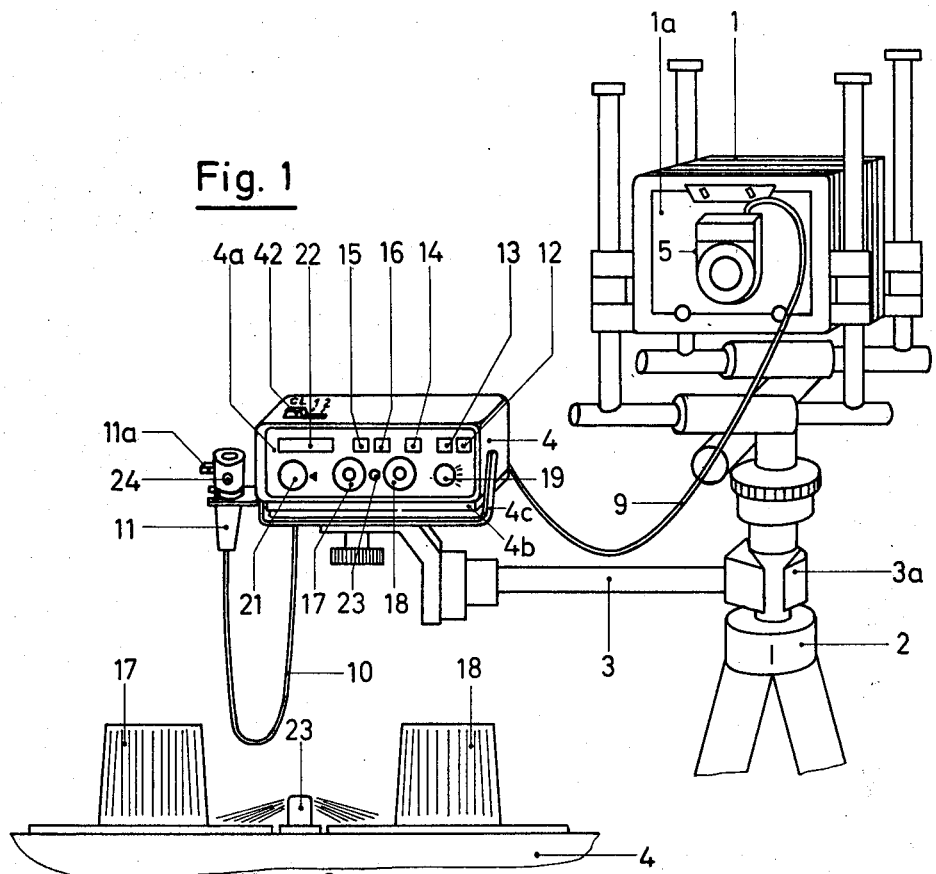
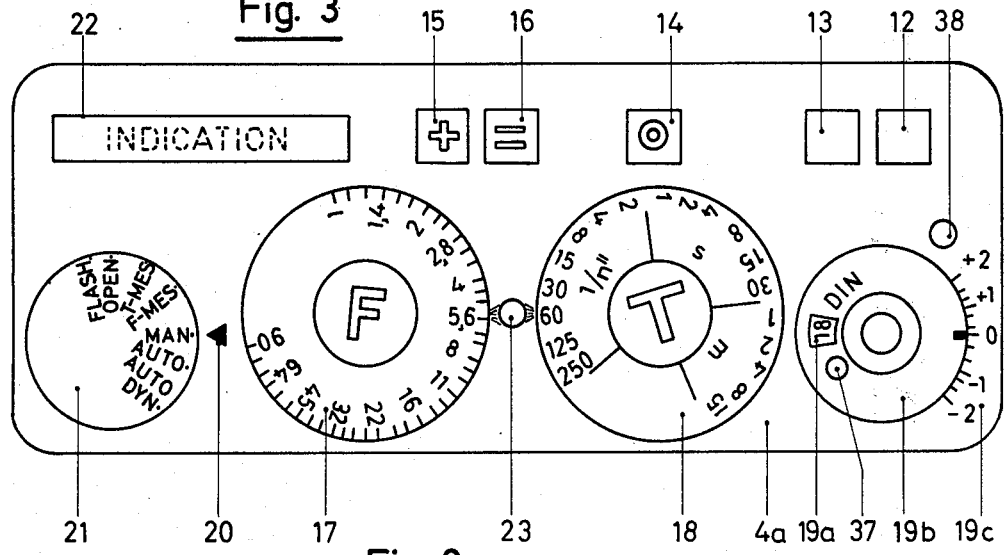

CONTROL DEVICE FOR PHOTOGRAPHIC CAMERAS

The invention relates to a control device for operating a magnetically actuatable shutter or magnetic shutter adapted to be connected thereto and an apparatus for setting and forming exposure values therefor, for use with cameras.

Control devices for cameras such as full size or professional cameras having an electromagnetically operated shutter are known as such. One of the disadvantages of these known arrangements is based on the fact that they can only be operated where there is a mains connection available, i.e. insuring a line current or house current supply both for the control device and the magnetic shutter, and therefore limiting camera operation to the immediate vicinity of the source of the mains current. Moreover, the known control device arrangement is provided only with the possibility of a manual preselection of setting values when taking photographs. A further disadvantage is that such control devices are adapted to specific technical peculiarities of a particular magnetic shutter and may only be operated in respect thereof.

It is among the objects and advantages of the present invention to overcome the above mentioned drawbacks and deficiencies of the prior art, and to provide a control device for cameras adapted to operate with an electromagnetic shutter which permits simple operation and which is universally usable, which permits operation of the camera shutter both independently of the mains current as well as with a mains connection, and in conjunction with a plurality of manual and automatic light meter and exposure control functions, and which imparts to a camera of the above kind an operating comfort or ease of use that is comparable substantially only with the most up-to-date miniature mirror reflex type cameras operable in several automatic exposure regions.

Other and further objects and advantages of the present invention will become apparent from a study of the within specification and accompanying drawings, in which:

FIG. 1 is a schematic perspective view of a professional camera fitted with a magnetic shutter, i.e. electromagnetically drivable shutter, supported on a tripod, and connected to a separate electronic control device in accordance with the present invention having a supplementary support, the control device being operatively connected to the camera shutter for determining, feeding and storing exposure values;

FIG. 2 is a schematic enlarged front view which shows the setting and switching display of the separate control device of FIG. 1;

FIG. 3 is a schematic view from above of a portion of the device of FIG. 2 which shows the two setting knobs for aperture and exposure time, between which a lamp is located acting at the same time as an index mark; and FIG. 4 is a schematic block circuit diagram of the electronic circuit of the control device and a measuring probe usable together with such device for measurement of the ambient light of the subject to be photographed.

According to the present invention there is provided a separate control device for photographic cameras such as large size structurally supported professional cameras, comprising:

a circuit device for setting, measuring and controlling shutter exposure values, to which an independent electromagnetically drivable shutter assembly for such a camera is adapted to be exchangeably connected for energized operation hereby, and an independent light meter probe detachably connectable to the circuit device and which contains a photoelectric transformer, a probe current to frequency converter and an amplifier for providing a brightness signal to the circuit device, wherein the circuit device includes an energizable electronic control circuit arrangement in which a gate is provided to which the corresponding brightness signal of the light meter probe and the signal of a periodically operating gate time pulse generator are supplied, such that the output signal of the gate time pulse generator homes on or is supplied to a meter or counter the resultant output brightness signal of which is stored in a first storage system, a control circuit current to frequency converter is provided which transforms selectively the analog values for film sensitivity, time, aperture and correction factor, supplied by means of potentiometers, into suitable frequencies, a second storage system is provided into which the stored brightness signal is fed and via a change-over arrangement one or more values selectively for film sensitivity, time, aperture and correction factor are supplied, a listing storage system in turn is provided in which the arriving pulse series are stored, a mode selector device connected with a computer are provided by means of which at least the following operating modes are selectable:

(a) operation with manual setting of both of the exposure parameters time and aperture, (b) operation with automatic control of one of the two exposure parameters time or aperture, in dependence upon lighting intensity, after manual presetting of the value of the other of such exposure parameters and of the film sensitivity, (c) operation with the taking of measurements enabling the determination of one of the two exposure parameters time or aperture, by means of the light meter probe, taking into account the film sensitivity and light intensity, or (d) operation with settings for opening and retaining in open position the electromagnetically drivable shutter assembly over a selective optional length of time, whereby the values stored in the listing storage system are processed, in accordance with the setting of the selector device, in the computer to ascertain the corresponding processed values, an indicator display arrangement is provided which indicates the computer ascertained values, and an operating mechanism circuit is provided by means of which the values ascertained in the computer may be controlled.

In this manner, besides a certain freedom of movement or performance in manipulating the camera due to the fact that the latter may also be operated without a mains connection, there may be provided an apparatus combination having a universal automatic exposure which is distinguished by a plurality of manual and automatic light meter and control functions, whereby large size cameras of the kind mentioned above satisfy all exposure conditions as are set for a modern photographic camera.

Thus, with the instant control device, besides the permitted independence from a mains supply or house current source, a substantial simplification of the exposure technique may be attained. This is seen, for example, in the fact that the photographer when taking photographs not only need carry out fewer manipulations, but also need take fewer test pictures, resulting in turn in shorter waiting periods. Moreover, the present invention permits improved utilization of the associated devices and on the whole permits faster exposure sequences or exposure results to be obtained.

In a favorable further development of the control device according to the present invention, the device is fitted in conventional manner at least with a battery and a charging device provided with a mains connection. This permits operating the camera both independently of the mains source and operating it with a mains connection, as desired. In accordance with this aspect of the invention, the control device may be fitted with a special plug connection in conventional manner for an external, separate portable current source replacing the battery or batteries included in the device, so that upon unexpected failure of the source of current in the device and in the absence of a mains connection photographing may be continued without interruption using the separate source of current.

A control device as contemplated herein is accordingly developed for simple and clear operation which avoids the photographer having to perform manipulations anywhere other than directly on the control device itself. Such may be attained advantageously in accordance with the present invention by specifically fitting the control device with an actuator for releasing shutters connectable to the device. It may, moreover, be of advantage if a socket for connecting the system to a remote release device is also provided.

In order to reduce the current consumption to the absolute minimum necessary rate, the control device in accordance with the present invention is preferably provided with a so-called economy circuit, i.e. an electronic circuit serving to switch off all current consuming elements with the exception of those current consuming elements which are capable of storing values. By this means, the control device switches off automatically during operating intervals after about a one minute "on" period without, however, cancelling the electronically stored exposure values.

Operations executed by mistake by the photographer during the automatic economy phase operation can be prevented, in that the switch-off state of the current consuming elements is indicated by a pilot lamp. In addition to the control functions transmitted to the pilot lamp, the latter may have a further function in that it is used to illuminate the setting dials associated therewith. This may be effected preferably in that the pilot lamp is located between two dials bearing the exposure values. In such location, the lamp also acts as a common index mark.

Since the control device desirably also satisfies the conditions for universal use, i.e. to determine, feed and store exposure values in cameras which are adapted to take different types of magnetic shutters, provision is made in accordance with the present invention for the independent control device to be fitted with a socket so that by means of a coded plug connector the device is automatically adapted to and conforms to the specific operating data associated with the individual type of shutter when applying the coded plug. Moreover, the control device is fitted with a further socket for a light meter probe, to which may be optionally connected a measuring probe for ambient light object measurement or a measuring probe for metering in the ground glass plane of the camera.

Conventional light-sensitive elements, such as e.g. silicon diodes performing the function of a photoelectric cell, have as known a relatively narrowly defined measuring range, which normally does not exceed a range of $2^{10}$Lux, which corresponds to an overall range of about 10 light values. This number of available light values, however, is not always adequate for taking photographs under brightness conditions which may occur in various locations, e.g. the central European area or like areas.

To remedy this deficiency, i.e. with relatively simple means to obtain an extension of the exposure range, the measuring probes according to the present invention are fitted with at least one filter fixedly mounted in front of the light sensitive element and a supplementary filter adapted to be displaced by an actuating member. Preferably, the actuating member has associated therewith a switch which, on attachment of the displaceably located filter, causes a measuring range change-over of the electronic evaluation circuit of the device.

In order to prevent adverse influences on the function of the control circuit, for example, attributable to a voltage drop in the lead between measuring probe and control device, the selector device control signal values according to the present invention may be converted into pulse series (frequency), and electronic elements or blocks for this conversion may be located in the measuring probe.

Since the measuring probe is connected via a cable to the control device, the time or aperture values measured at the subject being photographed may be fed directly into the control device, which may be effected by a storage button provided on the control device itself. Any simplification of the input values for the probe measurement may be attained in a simple manner by also providing a further storage button on the measuring probe, which additionally permits the photographer to store measuring values remotely from the location of the control device. Optimal exposure results when carrying out multiple measurements may be attained with the device by providing a mean value button to ascertain the arithmetic mean value from the setting or measuring values fed in by means of such storage button or buttons.

The advantages of the provision for an optional intervention in the automatic exposure for the purpose of obtaining certain photographic effects may be attained in the control device in accordance with the present invention in a simple manner by fitting the device with a setting member for correcting exposure control values.

Moreover, a switching member adjustable to three switching positions is further advantageously provided on the control device. The switching contacts of the switching member are so associated with one another that: in a first switching position the shutter mechanism assumes the closing position and the aperture mechanism assumes the open position adequate for the set working aperture; in a second switching position the shutter mechanism is moved into the open position, while the aperture mechanism retains the assumed operating aperture opening; and finally in the third switching position both the shutter and the aperture mechanism assume the fully open position. With this arrangement various kinds of observations may be carried out without any noticeable time consumption while avoiding additional setting manipulations on the control device.

In this regard, for the focusing on positions important to the picture it is more favorable when the aperture system as well as the shutter system are fully open, but for setting the depth of field it is more favorable if the aperture system remains at an aperture setting suitable for exposure and only the shutter system assumes the fully open position. In order to move both shutter and aperture systems mutually into the open position, a coupling connection actuatable by a switching member, for example, adapted as a magnetic coupling, may be provided in conventional manner. Operating errors in turn may be effectively avoided where the switching member is arranged so as to be actuatable independently of the mode selector device.

In a favorable further development, the control device in accordance with the present invention is fitted with a "fault/error indication," which reports an error when the measured or preset exposure values do not lie within the specific operating range of the magnetic shutter connected to the device. The error indication may be effected in conventional manner by a signal discernible by one of the human senses, e.g. by an optical and/or acoustic signal. Faulty exposures may be reliably avoided in the control device of the present invention if the latter is provided with a device to indicate the charge state or level of remaining power of the energy source. The control device preferably has means provided thereon for securing it to a bracket or holder which in turn may be mounted on the camera tripod by means of a clamping device. For handling the control device detached from the tripod, the device is conveniently provided with a carrying or standing yoke or a carrying belt, or the like.

Referring to the drawings, and initially FIG. 1, a large size professional camera 1 is mounted on a tripod 2, and a supplementary support 3 is provided which is connected to the tripod 2 by means of a clamping device 3a. Support 3 carries an independently provided, universally usable, electronic, exposure measuring and shutter control device 4 described below with regard to structure and method of operation.

The shutter assembly 5, detachably mounted in known manner on the camera body 1 by means of a connecting plate 1a, is adapted as a magnetic shutter, i.e. a shutter mechanism having an opening and closing system which is adapted to be actuated electromagnetically by two electromagnets 6 and 7 in the conventional manner as shown in FIG. 4. If necessary, the actuation or control of the diaphragm aperture mechanism also located in the shutter assembly may be effected by a similarly provided electromagnet 8.

The driving energy and the control pulses for the exposure time or aperture setting of the shutter mechanism or aperture mechanism, as the case may be, may be supplied to the appropriate electromagnets 6 and 7 or 8 of the magnetic shutter 5 via a connection cable 9. The cable 9 in turn, is fitted with a simple plug to connect one end of it to the shutter while its other end is connected to the control device by a selectively coded adjustable plug connector, e.g. schematically shown in FIG. 4 by broad vertical arrow 9a operatively interconnecting such plug connector with the computer RW via means 9b in conventional manner.

The necessity for coding of the plug connector, not further shown, arises from the desire to make the independent electronic control device 4 suitable for universal use with magnetic shutters 5 of varying types. In this way, the coded plug connector may perform the function of supplying the specific performance data inherent to a given shutter, with reference to the size of the light passage aperture and obtainable maximum shutter speed (of, for example, 1/60, 1/125 or 1/250 sec.), into the control device 4.

All further control pulses emanating from the control device 4 are communicated to the magnetic shutter 5 for operatively energizing the same via appropriate connecting leads also present in cable 9.

Besides the conforming coded connection, preferably located on the rear surface of the control device 4, such control device 4 has a further socket, e.g. schematically shown in FIG. 4, for a cable 10 of a measuring probe 11 having the shape, for example, of a hand microphone.

Additional corresponding type sockets are moreover provided in the conventional manner in the control device 4 in order, if and as required, to charge or recharge the energy source or battery means schematically shown at 51, contained in the control device and preferably formed by conventional rechargeable NC batteries, via a mains supply, or to enable a connection to be made between the electronic flash contact device schematically shown at 61 of the magnetic shutter 5 and the control device 4, e.g. via schematically shown external line 62 socket connected via internal line 62a to the electronic operating mechanism AW (FIG. 4). Moreover, the control device 4, in addition to the NC batteries, is fitted with a conventional charger mechanism 52 provided with a power charger indicator 53 adapted to be connected to the mains for charging or recharging the batteries in the usual manner, whereas a further socket connected via parallel line 54a with the main line 54 containing the battery means 51 is provided for an optionally usable external portable energy source as and if desired (FIG. 4).

For reasons of clarity and ease of manipulation, all operating and indicating elements of the electronic control device 4 are preferably mounted on a face plate 4a, shown on an enlarged scale in FIG. 2. The device itself as noted above is located on the supplementary support 3 so as to be rotatable and fixable about a vertical axis.

Moreover, a mounting plate 4b and a holder, not further shown, may be provided for the device 4, with the holder conveniently so formed that it permits the ready detachment of the separate and independent control device 4 and hence a free handling thereof. The housing of such completely portable control device 4 may be fitted for this purpose with either a carrying or standing yoke 4c or, alternatively, with a carrying belt.

This method of supplementary fitting of the control device 4 itself with one or more selective energy sources, preferably NC batteries, independently of the mains supply, for the first time advantageously opens up the range of possibilities of using large size commercial cameras fitted with a magnetic shutter, since these kinds of cameras have hitherto been dependent upon the use of mains connections as direct power sources.

As shown, moreover, in the embodiment of FIG. 2, the face plate 4a has switch buttons 12 and 13 for correspondingly switching "on" and "off" the energy source accommodated in the housing of the control device 4, an actuator or release button 14 for releasing the camera shutter and a storage button 15 for electronically storing exposure parameters and other exposure values influencing the exposure of the film. Moreover, the plate 4a is also provided with a mean value button 16 which serves to ascertain the arithmetic mean value from several exposure values stored in the control circuit.

Further provided on the face plate 4a are adjusting members 17 and 18 for manually feeding exposure values such as diaphragm aperture and shutter exposure time, a setting member 19 executing two functions, i.e. for taking into account the film sensitivity and a correction factor, and finally a setting member 21 adjustable opposite a fixed mark 20.

Setting member 21 is a component of a selector device, which includes several modes of operation having the abridged names given below but having quite specific control functions, as follows:

MAN—manual adjustment of exposure time and diaphragm aperture size by remote time setting on the control device;

F-Mes—diaphragm aperture size measurement with exposure time selection, and aperture size measurement with storage of several measurements at different subject positions and formation of a mean value;

T-Mes—exposure time measurement with aperture size preselection, or exposure time measurement with storage of several measurements and formation of a mean value;

AUTO—automatic exposure time with aperture size preselection, or automatic exposure time with storage of several measurements and formation of a mean value;

AUTO-DYN—automatic exposure time in auto-dynamic operation (measurement during exposure); and FLASH—aperture size measurement with electronic flash operation, including multiple flash during long exposure time taking into account the basic lighting or aperture size measurement with flash operation plus storage of several measurements and formation of a mean value.

In all the methods of operation mentioned above, with the exception of that which provides an automatic exposure time in auto-dynamic operation (AUTO-DYN), focal point measurements may be effected both with the measuring probe 11 on the subject and in a measuring cassette insertable in the camera in the ground glass plane in conventional manner and exchangeable with the probe 11.

In the mode of operation "AUTO-DYN," subject measurements are, however, only possible with the measuring probe 11, and not with the measuring cassette, since in this specific mode of operation the control circuit in accordance with FIG. 4 still has to process light-dependent measuring data which is imparted thereto immediately before or during the exposure operation in dynamic and continuous fashion. This cannot be attained with the measurement cassette which has to be changed for a film cassette before initiating the exposure operation, as the artisan will appreciate.

Other than the aforesaid setting members and associated parts 12 to 21, the face plate 4a also has an alphanumeric light indication arrangement 22 referred to hereinafter simply as a display and a control lamp 23. The lamp 23, besides the function of control indication during the storage operation, has the additional function of an index mark.

Moreover, the control lamp 23 is so formed that, as shown in FIG. 3, it is able to illuminate the numerals of the setting dials of aperture and time setting members 17 and 18, for which purpose, for example, lateral light passage apertures or windows may be formed on the lamp housing.

If the "on" button 12 is actuated, i.e. the electronic control circuit energized, then both the display 22 and the control lamp 23 light up and hence indicate the operational readiness of the apparatus. If no exposure settings and no release of the magnetic shutter 5 are effected, then the particularly constituted electronic control circuit arrangement of the control device 4, after about a one minute "on" period, automatically switches off again.

Excluded understandably from this switching-off operation, however, are all electronic switching and storing elements which electronically store the exposure values, i.e. those elements in the frame or control circuit C which via known switch circuit means 13a connected to the main power line 54 automatically continue to be supplied with power as shown schematically in FIG. 4, so that measuring results fed previously into the electric storage system in the form of impulses are retained. This feeding of measuring results and release of the shutter cannot, however, occur until the "on" button 12 has been actuated again. The extinguishing of the display 22, which occurs with the switching-off operation of the control device 4, is an external sign to show that the electronic circuit is not in a functional state, i.e. it is not in a condition for input and storage of exposure values and for releasing the magnetic shutter 5.

The object of the above-indicated "current-saving circuit" is to avoid an unnecessary current consumption when taking photos, i.e. to ensure that the capacity of the mains-independent energy source of the control device 4 itself is available for a maximum operating period.

If on the display 22 during actuation of the "on" switch 12 the word "battery" appears briefly, this warns that an early recharging of the NC batteries is necessary, and the electronic control circuit arrangement is so constituted that this operation will occur. If the indication remains for a relatively long period of time, then the effect is that the residual capacity of the current source is no longer sufficient for further shutter releases. In such a case, the magnetic shutter 5 must not be released, which, among other things, may be prevented by bringing a stop in suitable manner into action.

The electronic control circuit arrangement is furthermore so constituted that if on the display 22 the word "fault/error" appears, this indicates that either, as an oversight, the magnetic shutter 5 was not connected to the electronic control device 4, or that, by means of the time setting member 18, a time selection has been effected which is shorter than the magnetic shutter 5 connected to the device is able to provide.

If the electronic control circuit arrangement of the control device 4 is to be switched-off, it will be necessary to actuate the "off" button 13. When this occurs, the cancellation of any contents which may exist in the electronic storage system of the control device then automatically takes place.

As already indicated above, the electronic control device 4 may also effect both a brightness or subject measurement by means of the measuring probe 11 and a measurement in the ground glass plane by means of a measuring frame, known per se. Such a frame has a finger-like portion mounted so as to be rotatable about an axle, the free end of which fitted with a light-sensitive element, e.g. a photo-diode or the like, is adapted to be displaceable over the whole format surface.

For measurement, the frame is inserted behind the ground glass of the camera, whereupon the finger-like part may be orientated towards the portions of the picture to be measured. Feeding of the exposure metering results into the electronic control circuit may be effected either by means of the storage button 15 located on the face plate 4a or by means of a button mounted in the handle region of the finger-like part simultaneously serving for the storage of brightness values.

If during the taking of a photograph the subject measurement is used, then for feeding or storing the measuring result into the electronic control circuit the storage button 15 located on the control device 4 may be used. For the same purpose, however, a storage button 24 may be located on the measuring probe 11 itself.

Multiple measurements on different subject points may be stored electronically, for which purpose after each measurement operation the storage button 15 or 24 is actuated. All values fed in are processed in a microprocessor contained in the control device 4, described later in regard to FIG. 4, whereupon by actuating the so-called average value button 16 at any time the arithmetic average value is computed and indicated on the display 22 in digital values.

In the block circuit diagram of FIG. 4 there are shown those electronic circuit elements or blocks of the control device 4 operating on a fully electronic basis and of the probe 11 for subject and light measurement, each contained within a respective frame A or B, schematically indicated in chain-dotted lines. Of the magnetic shutter assembly 5 adapted to be connected detachably to the control device 4, FIG. 4 only shows a simplified diagrammatic representation limited to the conventional magnetic drive for the shutter opening and closing mechanism or system and separately for the aperture mechanism or system.

Concerning the independent light meter probe 11 provided for subject and selective measurement respectively, this has a focusing lens L (FIG. 4) which is located on the end face of a housing substantially corresponding in shape to the exterior of a conventional hand microphone. This lens has a light-sensitive element, or photoelectric transformer, preferably a silicon diode FD, located at the end of the path of the incident light.

During the operation of light measurement by means of the measuring probe 11 described in detail below, in order to enable the spectral sensitivity to be taken into consideration, a filter $F_1$ remaining constantly in the path of the incident light is provided, e.g. stationarily, in the region between the lens L and the photodiode FD. A further, supplementary filter $F_2$, for displacement of the measuring range, is located in a manually actuatable slider 11a preferably linearly displaceably mounted in the housing of the measuring probe 11 so as to be displaceable into the path of the incident light.

By this means two measuring regions are provided for the measuring probe 11. When the spectral filter $F_1$ alone is positioned in front of the photodiode FD, for example, one such region is provided, beginning at 0.01 Lux and terminating at about 610 Lux, and when besides the spectral filter $F_1$ the supplementary filter $F_2$ is also positioned in the light path, e.g. in tandem series alignment therewith, the second region is provided, terminating preferably at 310,000 Lux. Both measuring regions are so adapted to one another and associated with one another that they overlap desirably by about 3 exposure stages.

The photodiode FD is connected to a current to frequency converter $W_1$ which converts the control signal values or current produced by light impinging on the light-sensitive element FD into a frequency or pulse series, which is proportional, linearly, to the value of the current. The current to frequency or A/F-converter $W_1$ is connected to an amplifier $VS_1$ which, exerting the function of a conductor/lead transmitter, amplifies the frequency produced in the converter $W_1$ in such a manner that the control signals are clearly discernible even for a long connecting cable 10 and arrive at the control device 4 without interference.

The control signals from the measurement probe 11 or the measurement frame are supplied via the input of a microprocessor logic arrangement which has the function of an AND gate 30, the other input of which is connected to the output of a gating time pulse generator TZ. The pulse series is fed from the output of the AND gate 30 to an electronic meter or counter Z which converts the pulse series into binary numbers.

Before, however, the gating pulse generator TZ supplies to the counter Z a pulse series proportional to the current from the probe or measurement frame, it is necessary first for the electronic counter Z to be set to "zero" by the pulse of a reset pulse generator RG. Only then, when this has been done, does it count and in doing so transmits the counting result to an electronic memory SP or first storage system in which the result is retained.

The counting operation as such is repeated in a continuous sequence, in time intervals of a few milliseconds, which means that the counting result in the memory SP can never be older than the length of the gating time, acting as comparison standard. The memory SP hence receives, repeatedly in rhythm with the gating pulse generator TZ, new information in the form of a series of pulses, whereby the information previously stored is always cancelled before the new information is stored.

Besides the memory SP, the electronic control circuit also has a further electronic memory SW or second storage system in which information supplied by the memory SP and further information supplied by the current to frequency or A/F-converter $W_2$ is retained. The control circuit also contains a listing LS or listing storage system for storing electronic data and a computer RW cooperating with a mode selecting device to be described in detail below. Lastly, there is an electronic operating mechanism AW in which all values and measurement results fed to the control circuit are processed.

The above-mentioned essential functional elements of the electronic control circuit arrangement, as shown in FIG. 4 within the frame C in broken lines, like all other structural groups and individual elements mentioned below may be accomplished by a program logic arrangement in a microprocessor, as the artisan will appreciate.

As further evident from the block circuit diagram of FIG. 4, the electronic control device 4 has several analog value suppliers, e.g. manually adjustable potentiometers 33 to 36, which as indicated are for alteration and setting of the film sensitivity FE, the "time" and "aperture" preselection, and the appropriate correction factor. The setting of the potentiometers 33 to 36 is effected by means of the members 17, 18 and 19 and a commutator U or change-over arrangement, e.g. as shown in FIGS. 2 and 4.

The member 19 is composed of two parts 19a and 19b variable in their position relative to each other and which are so superposed that a setting of the film sensitivity factor (18° DIN indicated in the window in FIG. 2) once effected will also be maintained if the part 19b is set to a predetermined value appertaining to the correction value scale 19c.

A pushbutton 37 allows the parts 19a and 19b to be engaged or disengaged with one another, while by means of a pushbutton 38 the setting member 19 as a whole is engageable or disengageable relative to the scale 19c.

The potentiometer preselecting values adjustable by means of the setting members 17 to 19 are fed as appropriate resistance values into the A/F-converter $W_2$, similar to the converter $W_1$, and a conversion of the current flow in frequency occurs corresponding to the potentiometer setting. The frequency or pulse series in turn is supplied to the memory SW which, in a continuous cycle, checks the setting values of the potentiometers 33 to 36 and systematically stores the resulting frequency in the listing LS.

The computer RW associated with the electronic control circuit now, with aid of the operating mode switch 21, tests the problem set (setting position of the selector device) and processes accordingly the values recorded in the listing LS. The result of the calculating process is made available to the electronic operating mechanism AW and simultaneously made known in the display 22 by alpha-numerical indication.

The operating mechanism AW in turn awaits a button feed ("average" or "release") and then processes the results imparted thereto from the computer RW. Subsequently, the shutter coding is tested (COD. SHUTTER CONN.) to determine the shutter type connectable to the control device 4, whereupon a decision is made as to whether the function formed in the operating mechanism AW may be effected or not.

If the decision is affirmative, execution occurs immediately. Otherwise, on account of the shutter coding, a fault report appears in the display 22, where the term "FAULT V" flashes on. If the operating mechanism AW expects a shutter release to be carried out, then the signal producing the release is communicated via an amplifier $VS_2$, connected at the output of the operating mechanism AW, to the electromagnetic drive 6 and 7 respectively of the magnetic shutter mechanism 5 and synchronously therewith is indicated on the display 22.

Described below in detail are the essential functional operations in the electronic control circuit of control device 4, i.e. after prior setting of the setting member 21 of the selector device to one of the following possible types of operation:

1. Setting position "Open"

This position corresponds to the T-setting conventionally known in cameras. In this position:

(a) All previous values fed into the listing LS by the computer RW are ignored.

(b) At the same time, the camera shutter 5 connected therewith is tested via the conforming plug connector for its characteristics, i.e. performance data.

(c) If the camera shutter 5 connected to the control device 4 properly shows the identical data for the setting effected, the operating mechanism AW orders the switching amplifier $VS_2$ to open the shutter. The latter now remains in the open position until the setting member 21 of the selecting device is moved, e.g. manually, out of the operating mode "Open." This causes an influence to be exerted on the computer RW, which in turn results in the opening and closing system of the camera shutter changing over from the open to the closed position.

2. Setting position "MAN"

In this position:

(a) The electronic computer RW reads the value corresponding to the preselected time value stored in the listing LS.

(b) Via the shutter plug connector there then occurs a testing for characteristics and performance data respectively of the connected shutter.

(c) The computer RW issues an opening command to the operating mechanism AW which transmits this command, when the manual release button 14 of the control device is subsequently actuated. The release command in turn is now transmitted to the switching amplifier $VS_2$ which by emitting a pulse causes the magnetic shutter 5 to open.

(d) If the exposure time preselected at the time setting member 18 has expired, the computer RW issues a new command via the operating mechanism AW and the switching amplifier $VS_2$ which brings about the immediate closing of the shutter. It will be seen that actuation of the storage or average value button 15 or 16, respectively, is without effect during the operating mode setting "MAN".

3. F-measurement position

In this setting, the mode of operation of the electronic computer RW is as follows:

(a) By means of the potentiometers 33 to 36, values for film sensitivity, time and correction correspondingly fed into the converter $W_2$ are taken over and combined with the measurement values ascertained by the brightness meter (measuring probe 11 or measuring frame) while taking into account the lighting intensity. As a result, an aperture value is indicated on the display 22 which has been calculated in the electronic computer RW from the aforesaid values and which is adjustable at the shutter mechanism and the lens diaphragm aperture mechanism respectively.

(b) The ascertained measurement value may be retained in the electronic operating mechanism AW by actuating one of the corresponding storage buttons 15 or 24. Values identified by further measurements may also be stored in the electronic operating mechanism AW.

(c) Upon depressing the average value button 16, the arithmetic mean is formed from all the aperture values previously stored and indicated on the display 22. This indicated value may subsequently be adapted by calculation according to new parameters by varying the manually adjustable time value, the film sensitivity value and/or the correction value. The aperture value now calculated then appears instead of that hitherto shown on the display 22, and remains unless one of the storage buttons, which simultaneously exert a cancelling function, is actuated.

(d) Release of the camera shutter 5 is effected by applying pressure to the release button 14, whereby the same functional cycle occurs in the control circuit, as already described above under the operation "MAN."

4. T-measurement position

In this setting, the mode of operation of the electronic computer RW is as follows:

(a) The values for film sensitivity, exposure time and correction factor correspondingly fed by means of the potentiometers 33 to 36 as aforesaid, are taken from the converter $W_2$ and linked with the measurement value ascertained by the measuring probe 11 or the measuring frame. As a result, an exposure time value is indicated which has been calculated from the said values in the electronic computer RW.

(b) This measurement value may be retained in the operating mechanism AW by actuation of the corresponding storage button 15 or 24. Subsequently, any number of other values also identified by measurement may be stored.

(c) By actuating the mean value button 16 the arithmetic mean may be formed from the previously ascertained and fed time values. The time setting member 18 of the control device is set to this value before the magnetic shutter 5 is released. If the release button 14 is actuated, the same functional cycle occurs in the electronic control circuit as already described above.

5. AUTO-position

In this setting, the method of operation of the electronic computer RW is as follows:

(a) The electronic computer RW reads the stored film sensitivity, aperture and correction values and transmits these values to the electronic operating mechanism AW. The latter now awaits the actuation of the release button 14.

(b) In the meantime, brightness points are determined by means of measuring probe 11 or in the measuring frame and the measurement result is linked with the previously set parameters and is also indicated at the display 22 as in "T-Mes."

(c) By actuating the storage button 15 or 24 various instantaneous values may now be taken over and stored in the electronic operating mechanism AW of the control circuit. By actuating the mean value button 16 the arithmetic mean of the stored values may be formed.

(d) If the magnetic shutter 5 is then released, the shutter is retained in open position in accordance with the time value indicated at the display 22. On release, the shutter runs off automatically in accordance with the indicated exposure time, which does not change even if during the exposure operation the light conditions meanwhile change. Times set by means of the setting member 18 in the operating type "AUTO" are ineffective, whereas the aperture setting on the apparatus as preselected value becomes effective during the automatic exposure time formation.

6. AUTO-DYN-position

In this setting, the operating mode contemplates the application of all features of the operating type "AUTO," with the exception that the "AUTO" operation can be carried out only with the sensor before the subject measurement, because the counterpart "dynamic" measurement also continues during the running off of the shutter:

(a) The film sensitivity, aperture and correction values are taken, as before, and linked with the brightness value ascertained with the aid of the measuring probe 11 to provide a time value which is indicated at the display 22. The electronic operating mechanism AW now awaits a release command. After actuating the release button 14 the particular light quantity is calculated, which, linked with and supplemented by preset values, is necessary to insure a correct lighting of the subject to be photographed.

(b) The magnetic shutter 5 opens and maintains the open position until the light quantity, which has previously been ascertained in the electronic computer RW, has passed the light-sensitive element.

(c) Any actuation of the storage or mean value button 15 or 16 does not effect the function cycle. The exposure time indicated at the display 22 comes into effect on release of the shutter provided that during the open time the light conditions remain constant. If the brightness conditions change during the open period, then this is taken into account during the automatic exposure time causing a deviation from the indicated time, because the dynamic measurement in the electronic control circuit for the light passing the light-sensitive element continues also during the shutter run-off.

7. FLASH-position

In this position:

(a) The operating mode switch 21 is adjusted for the electronic computer RW to take the preset values for film sensitivity, exposure time and correction factor.

(b) The actuation of the storage button 15 or 24 initiates, with synchronous ignition of at least one test flash, only one measurement phase which lasts until the manually preset exposure time, which in this instance has the functional importance of a "gate time" attributed thereto, has expired.

(c) During this measuring phase, the existing permanent light and possibly also several successively following test flashes as far as they are located within the set measuring time (exposure time), are taken into account and linked with the fed values for film sensitivity and correction factor and the time value. As a result, an aperture value is formed which is fed into the electronic operating mechanism AW and simultaneously indicated at the display 22.

(d) From several aperture values ascertained in such a manner, after actuating the mean value button 16 the arithmetic mean of the fed values is formed and subsequently the aperture value indicated on the display 22 is adjusted or set at the lens or the camera shutter, as the case may be. During the subsequent shutter release, which is initiated by the actuation of the release button 14, the number of flashes to be emitted and the position of the electronic flash device should be the same as during the measuring operation.

(e) If storage button 15 and mean value button 16 are actuated simultaneously, the extent of contrast is ascertained in the control circuit from all individual measurements and, for example, indicated in the display 22. By the term contrast, in this regard, there is to be understood the difference between the brightest and the darkest point measured on the subject by means of the measuring probe 11. The corner values of the contrast may, if necessary, also be shown as a ratio number or as a logarithmic term at the display 22.

As if evident from the block circuit diagram of FIG. 4, referring to the measuring probe 11, the slider 11a carrying the supplementary filter $F_2$ has a switch 40 associated therewith the function of which is to take into account the additional filter $F_2$ and the accompanying measurement region conversion in the electronic evaluation circuit of the control device. For this purpose the arrangement of the switch 40 with reference to the switching cam formed on the slider 11a is such that a contact in the switch 40 is always only made when the supplementary filter $F_2$ is located in the path of the light.

The numeral 42 in the block circuit diagram of FIG. 4 illustrates a further contact switch provided both with a connection to the selector device and a connection to the magnetic drives 6 to 8 of the camera shutter 5. The switch 42 as such is so fashioned that in all it is able to assume three different contact positions, namely a contact position "CLOSED" and two further contact positions "OPEN 1" and "OPEN 2".

The circuit arrangement is such that in the first switch position "CLOSED" the shutter mechanism assumes the closing position and the aperture mechanism assumes the open position corresponding to the operating aperture set.

If the switch 42 is moved to the second switching position "OPEN 1", the aperture mechanism maintains the operating aperture position assumed, while the shutter mechanism is moved to the fully open position.

In the third position "OPEN 2", both the shutter and aperture mechanism are moved from the previously assumed setting position into the fully open position. This, for example, may be carried out by means of a conventional magnetic coupling or the like between the shutter mechanism and aperture mechanism which comes into action in the switching position "OPEN 2".

The switch 42, as indicated in FIG. 1, for the purpose of simpler and clearer manipulation, may be optionally located on the upper housing surface of the control device 4 and, for example, may be formed as a slider switch.

Thus, the present invention broadly contemplates a separate control device for photographic cameras such as large size structurally supported professional cameras, comprising:

a circuit device for setting, measuring and controlling shutter exposure values, having shutter connector means for exchangeable operative connection therewith for energized operation thereby of an independent electromagnetically drivable shutter assembly for such a camera, and further having light meter connector means for detachable operative connection therewith of an independent light meter probe for providing a brightness signal thereto, wherein the circuit device includes an energizable electronic control circuit arrangement provided with a gate, a periodically operating gate time pulse generator, a meter or counter, a first storage system, a control circuit current to frequency converter, analog value suppliers for film sensitivity, time, aperture and correction factor values, a second storage system, a change-over arrangement, a mode selector device, a computer, and an operating mechanism circuit, in which the corresponding brightness signal of the light meter probe and the signal of the periodically operating gate time pulse generator may be supplied to the gate, such that the output signal of the gate time pulse generator homes on or is supplied to the meter or counter and the resultant output brightness signal of the meter or counter is stored in the first storage system, in which one or more analog values selectively for film sensitivity, time, aperture and correction factor may be supplied via the change-over arrangement from the corresponding analog value suppliers to the control circuit current to frequency converter for transforming selectively such analog values into suitable frequencies, such that the stored brightness signal from the first storage system and such frequency transformed analog values from the control circuit current to frequency converter are fed to the second storage system and in turn are stored as arriving pulse series in the listing storage system, and in which the mode selector device is connected with the computer by means of which at least the following operating modes are selectable:

(a) operation with manual setting of both of the exposure parameters time and aperture, (b) operation with automatic control of one of the two exposure parameters time or aperture, in dependence upon lighting intensity, after manual presetting of the value of the other of such exposure parameters and of the film sensitivity, (c) operation with the taking of measurements enabling the determination of one of the two exposure parameters time or aperture, by means of the light meter probe, taking into account the film sensitivity and light intensity, or (d) operation with settings for opening and retaining in open position the electromagnetically drivable shutter assembly over a selective optional length of time, whereby the values stored in the listing storage system may be processed, in accordance with the setting of the selector device, in the computer to ascertain the corresponding processed values and in turn controlled by the operating mechanism circuit.

It will be realized that the foregoing specification and accompanying drawings are set forth by way of illustration and not limitation of the present invention, and that various modifications and changes may be made therein without departing from the spirit and scope of the present invention which is to be limited solely by the scope of the appended claims.

What is claimed is:

1. Separate control device for photographic cameras such as professional cameras, comprising a circuit device for setting, measuring and controlling shutter exposure values, to which an independent electromagnetically drivable shutter assembly for such a camera is adapted to be exchangeably connected for energized operation thereby, and an independent light meter probe detachably connectable to the circuit device and which contains a photoelectric transformer, a probe current to frequency converter and an amplifier for providing a brightness signal to the circuit device, wherein the circuit device includes an energizable electronic control circuit arrangement in which a gate is provided to which the corresponding brightness signal of the light meter probe and the signal of a periodically operating gate time pulse generator are supplied, such that the output signal of the gate time pulse generator is supplied to a counter the resultant output brightness signal of which is stored in a first storage system, a control circuit current to frequency converter is provided which transforms selectively the analog values for film sensitivity, time, aperture and correction factor, supplied by means of potentiometers, into suitable frequencies, a second storage system is provided into which the stored brightness signal is fed and via a change-over arrangement one or more values selectively for film sensitivity, time, aperture and correction factor are supplied, a listing storage system in turn is provided in which the arriving pulse series are stored, a mode selector device connected with a computer are provided by means of which at least the following operating modes are selectable:

(a) operation with manual setting of both of the exposure parameters time and aperture,
(b) operation with automatic control of one of the two exposure parameters time or aperture, in dependence upon lighting intensity, after manual presetting of the value of the other of such exposure parameters and of the film sensitivity,
(c) operation with the taking of measurements enabling the determination of one of the two exposure parameters time or aperture, by means of the light meter probe, taking into account the film sensitivity and light intensity, or
(d) operation with settings for opening and retaining in open position the electromagnetically drivable shutter assembly over a selective optional length of time, whereby the values stored in the listing storage system are processed, in accordance with the setting of the selector device, in the computer to ascertain the corresponding processed values, an indicator display arrangement is provided which indicates the computer ascertained values, and an operating mechanism circuit is provided by means of which the values ascertained in the computer may be controlled.

2. Device according to claim 1 wherein the device is a battery energized device provided with means for containing a rechargeable battery and a charging device connectable to a mains power source.

3. Device according to claim 2 wherein the device is provided with means for containing a separate socket connector for an external portable energy source to take the place of such battery.

4. Device according to claim 1 wherein an actuator is provided for operatively releasing the shutter of a shutter assembly exchangeably connectable with the device.

5. Device according to claim 4 wherein the device is provided with means for containing a release socket for connecting a remote control release for the shutter of such shutter assembly.

6. Device according to claim 1 wherein the electronic control circuit arrangement is provided with a switch member for selectively switching off all current consuming elements except the current consuming elements which are capable of electronically storing values.

7. Device according to claim 6 wherein a control lamp is provided for indicating the state of switching off of such current consuming elements.

8. Device according to claim 7 wherein the device is provided with setting dials, and the control lamp is arranged to serve additionally for the illumination of the setting dials.

9. Device according to claim 8 wherein the dials are provided for the setting of the exposure values, and the control lamp is located between such dials whereby to serve both to illuminate the dials and to act as a common index mark therefor.

10. Device according to claim 1 wherein a shutter cable connecting socket is provided for the circuit device which is adjustable to conform to the individual specific operating data associated with the particular individual shutter assembly types exchangeably connectable therewith by means of a coded connector.

11. Device according to claim 1 wherein a light meter probe connecting socket is provided for the circuit device permitting detachable connection of a light meter probe constituting a measuring probe for photographic subject measurement and exchangeably of a light meter probe constituting a measuring probe for ground glass measurement.

12. Device according to claim 1 wherein the light meter probe constitutes a measuring probe provided with at least one main light filter stationarily located in front of the photoelectric transformer constituted as a light-sensitive element, and a supplementary light filter carried by an actuating member so as to be displaceable into and out of the light path, the actuating member having a switch associated therewith which, when placing the displaceably located supplementary filter in tandem series alignment with the main filter, causes a measuring region conversion of the corresponding electronic evaluating circuit of the circuit device.

13. Device according to claim 12 wherein the light meter probe contains electronic elements arranged for converting control signal values into frequency pulse series in dependence upon the setting position of the mode selector device.

14. Device according to claim 1 wherein an electronic storage button is provided for the feeding of setting or measuring values into the circuit device.

15. Device according to claim 14 wherein the electronic storage button is provided on the circuit device and an alternative such electronic storage button is additionally provided on the light meter probe.

16. Device according to claim 15 wherein a mean value button is also provided on the circuit device for determining the arithmetic mean value from the setting or measuring values which are fed by means of one of said electronic storage buttons to the circuit device.

17. Device according to claim 1 wherein a setting member is provided for correcting exposure control values.

18. Device according to claim 1 wherein the electromagnetically drivable shutter assembly is of the type having a controllable shutter mechanism and a controllable aperture mechanism, and a switching member is provided in the circuit device which is adjustable to three switching positions, the switch contacts of which are associated with one another such that in a first switching position the shutter mechanism is controllable to assume the closing position and the aperture mechanism is controllable to assume the open position appropriate to the set operating aperture, in a second switching position the shutter mechanism is controllable to move to open position and the aperture mechanism is controllable to maintain the already assumed open position set operating aperture, and in the third switching position both the shutter mechanism and the aperture mechanism are controllable to assume the corresponding fully open position.

19. Device according to claim 18 wherein connection means actuatable by the switching member are provided for causing the shutter mechanism and aperture mechanism of the shutter assembly to move together to the corresponding fully open position.

20. Device according to claim 18 wherein the switching member is selectively actuatable independently of the mode selector device.

21. Device according to claim 1 wherein fault indicator means are provided in the electronic control circuit arrangement for reporting a fault or error where the measured or preset exposure values in the circuit device are not within the specific operating range of a specific electromagnetically drivable shutter assembly upon connection thereof to the circuit device.

22. Device according to claim 21 wherein the fault indicator means reports the fault by a signal discernible by one of the human senses.

23. Device according to claim 1 wherein charge indicator means are provided in the electronic control circuit arrangement for indicating the charge state of a power source for energizing the circuit device.

24. Device according to claim 1 wherein mounting means are provided for connecting the control device to a support adapted to be clampingly mounted on a tripod for the camera.

25. Device according to claim 1 wherein portable carrying means are provided for manually carrying the control device.

26. Device according to claim 1 wherein the circuit device is provided with a flash operating mode position for permitting the aperture value which is to be set on the camera shutter assembly to be ascertained at least by a test flash emitted before taking a photograph, using the preselected exposure time as measuring basis for the light quantity to which the light-sensitive film material is to be subjected during the subsequent flash exposure.

27. Device according to claim 26 wherein an electronic storage button is provided for feeding of setting or measuring values into the circuit device, and the storage button is arranged to be used in the flash operating mode position both for igniting an electronic flash device associatable with the camera and connectable with the circuit device for emitting a test flash and for releasing a measuring operation for ascertaining the brightness conditions during the test flash emittance.

28. Device according to claim 1 wherein an electronic storage button is provided for the feeding of setting or measuring values into the circuit device and a mean value button is provided for determining the arithmetic mean value from the setting or measuring values which are fed by means of the storage button to the circuit device, and the electronic control circuit arrangement is arranged so that with simultaneous actuation of the storage and mean value buttons the composite balance of the brightness values ascertained from all of the individual measurements is indicated by suitable indicia on the display arrangement.

29. Separate control device for photographic cameras such as large size structurally supported professional cameras, comprising a circuit device for setting, measuring and controlling shutter exposure values, having shutter connector means for exchangeable operative connection therewith for energized operation thereby of an independent electromagnetically drivable shutter assembly for such a camera, and further having light meter connector means for detachable operative connection therewith of an independent light meter probe for providing a brightness signal thereto, wherein the circuit device includes an energizable electronic control circuit arrangement provided with a gate, a periodically operating gate time pulse generator, a counter, a first storage system, a control circuit current to frequency converter, analog value suppliers for film sensitivity, time, aperture and correction factor values, a second storage system, a change-over arrangement, a mode selector device, a computer, and an operating mechanism circuit, in which the corresponding brightness signal of the light meter probe and the signal of the periodically operating gate time pulse generator may be supplied to the gate, such that the output signal of the gate time pulse generator is supplied to the counter and the resultant output brightness signal of the counter is stored in the first storage system, in which one or more analog values selectively for film sensitivity, time, aperture and correction factor may be supplied via the change-over arrangement from the corresponding analog value suppliers to the control circuit current to frequency converter for transforming selectively such analog values into suitable frequencies, such that the stored brightness signal from the first storage system and such frequency transformed analog values from the control circuit current to frequency converter are fed to the second storage system and in turn are stored as arriving pulse series in the listing storage system, and in which the mode selector device is connected with the computer by means of which at least the following operating modes are selectable:

(a) operation with manual setting of both of the exposure parameters time and aperture, (b) operation with automatic control of one of the two exposure parameters time or aperture, in dependence upon lighting intensity, after manual presetting of the value of the other of such exposure parameters and of the film sensitivity, (c) operation with the taking of measurements enabling the determination of one of the two exposure parameters time or aperture, by means of the light meter probe, taking into account the film sensitivity and light intensity, or, (d) operation with settings for opening and retaining in open position the electromagnetically drivable shutter assembly over a selective optional length of time, whereby the values stored in the listing storage system may be processed, in accordance with the setting of the selector device, in the computer to ascertain the corresponding processed values and in turn controlled by the operating mechanism circuit.

30. Device according to claim 29 wherein an indicator display arrangement is provided which indicates the computer ascertained values.

31. Device according to claim 29 wherein the analog value suppliers are corresponding potentiometers.

* * * * *